United States Patent [19]
Waite

[11] Patent Number: 4,802,984

[45] Date of Patent: Feb. 7, 1989

[54] COMPOSITE SEMIPERMEABLE MEMBRANE

[75] Inventor: Warren A. Waite, Burlington, Mass.

[73] Assignee: Ionics, Incorporated, Watertown, Mass.

[21] Appl. No.: 190,204

[22] Filed: May 4, 1988

[51] Int. Cl.$^4$ .............................................. B01D 13/00
[52] U.S. Cl. ................................ 210/490; 210/500.34; 210/500.35; 210/500.37
[58] Field of Search .............. 210/490, 500.34, 500.35, 210/500.37, 500.42; 55/16, 158; 427/244, 245, 246

[56] References Cited

U.S. PATENT DOCUMENTS 4,243,701 1/1981 Riley et al. ...................... 55/158 X
4,737,325 4/1988 Kamiyama et al. ....... 210/500.42 X

*Primary Examiner*—Frank Spear
*Attorney, Agent, or Firm*—Norman E. Saliba

[57] ABSTRACT

A composite semipermeable membrane on a semiporous support or substrate is produced by employing an interfacial polymerization reaction between (1) an aqueous phase comprising a blend of water soluble and water dispersable compounds and (2) an organic phase comprising poly-functional crosslinking reagents capable of reacting and/or polymerizing with one or more of the ingredients of said aqueous phase.

9 Claims, No Drawings

COMPOSITE SEMIPERMEABLE MEMBRANE

FIELD OF THE INVENTION

This invention relates to thin film composite membranes for the selective removal of solids from fluid mixtures or solutions. In particular the invention relates to a dual layer membrane in which an ultra thin polymeric layer of an amino compound and a water insoluble dispersion or emulsion of polymers or copolymers is supported on a microporous support layer.

BACKGROUND OF THE INVENTION

Permselective membranes suitable for use in desalination of aqueous solutions are the subject of numerous patents. Cadotte U.S. Pat. No. 4,277,344 discloses perselective multi-layer membranes in which there is a microporous polysulfone substrate layer and a juxtaposed polyamide layer made from an aromatic triacid halide and an aromatic diamine. Scala et al. U.S. Pat. No. 3,744,642 discloses multilayer membranes in which one layer is a porous substrate and the juxtaposed layer is a polyamide, a polyphenylester, or a polysulfonamide. Hara et al. U.S. Pat. No. 4,353,802 discloses semipermeable composite membranes in which the membrane material is cross-linked using polyfunctional aromatic acid halides. Kamiyama et al. U.S. Pat. No. 4,619,767 discloses permselective multi-layer membranes having a (1) microporous substrate layer (2) an ultra thin layer of a cross-linked polyvinyl alcohol/amino compound and (3) a porous inner layer of water insoluble polyvinyl alcohol located between the porous substrate and ultra thin layer. Other patents disclosing the preparation and properties of thin film composites are U.S. Pat. Nos. 3,951,815; 4,005,012; 4,039,440 and 4,277,344.

Thin film composite (TFC) membranes appear to be the most efficient reverse osmosis (R.O.) membranes known today. These membranes are conveniently made by interfacial condensation polymerization to yield ultra thin films at the interface of an aqueous phase layer and a non-aqueous or organic (solvent) phase layer. Since the two phases are substantially immiscible, a super thin film will be generated at the interface of the two layers. Since the reaction is diffusion controlled and self-limiting, the method yields ultra thin films, typically 50–5000 Å thick.

BRIEF DESCRIPTION OF THE INVENTION

The water or aqueous phase employed in the prior art typically contains only those ingredients that are water soluble such as for example, surfactants, amines, acid acceptors and the like. In the fabrication of the membranes of the present invention there is added to the aqueous phase "water insoluble" ingredients in the form of water emulsion or dispersions of natural or synthetic latexes comprised of water insoluble polymers or copolymers. The use of these latexes or emulsions makes possible the fabrication of a novel series of latex bonded or modified thin film composite membranes possessing most desirable properties of high flux rates and improved rejection rates. The incorporation of emulsions in the aqueous phase of the membrane manufacturing system permits one to modify the physical and chemical properties of the membranes to allow their use in more demanding thermal, mechanical and chemical environments.

The number and types of emulsions (dispersions, latexes) that can be blended with water solutions of amines, surfactants, caustic, etc. is almost limitless. The blending of monomeric or polymeric emulsions with the desired water soluble ingredients allows one to enhance specific properties of the finished membrane. Typically the use of a vinyl fluoride emulsion would result in a membrane having improved chlorine resistance, improved stiffness/strength and/or reduced tendency to foul. Other types of emulsions may also be selected to improve the membranes flexibility, gas transmission, adhesion to substrates, and resistance to solvents, temperature or bacteria.

The properties and performance characteristics of the thin film composites is significantly determined by the ingredients in the aqueous phase system, both the water soluble components and the non-water soluble emulsions. The organic phase system is usually limited to ingredients that are soluble in and inert to rapidly evaporating solvents such as hexane, freons, etc. Such ingredients dissolved in the solvents are normally very reactive cross-linking agents such as trimesoyl chloride, toluene diisocyanates etc.

DETAILED DESCRIPTION

The procedures of Kamiyama, U.S. Pat. No. 4,619,767 are illustrative of the conditions needed for preparing composite membranes of the present invention. The process consists essentially of several steps:

A microporous substrate with pores in the range of 0.005 to 0.5 microns in diameter is prepared. This may be accomplished preferably with a polysulfone, cast from a 15% solution thereof in dimethylformamide and immediately quenched in water to precipitate the polysulfone and extract the solvent.

The substrate (dried and stored, or fresh and wet) is then loaded with the "water phase" solution containing the desired emulsion, ammino compound etc.; and the excess solution removed from the surface by some draining, rolling or sponging procedure. The concentration of the components in the "water phase" solution is an important factor in the performance of the resulting composite.

The loaded substrate is then immersed in the "organic phase" solution containing the polyfunctional cross-linking agent in a solvent such as hexane or mixtures thereof (solvents which do not adversely affect the porous structure of the polysulfone substrate) for 5–90, preferably 15–35 secs. at room temperature. Formation of the emulsion bonded, or modified polyamide thin film causes the originally shiny substrate to have a dull finish.

The resulting composite is then dried at temperatures of 20°–100° C., preferably 50°–70° C., for periods of 5–180 secs., preferably 15–60 secs., to establish adhesion of the surface film to the polysulfone substrate. The residual components and reaction byproducts are extracted by soaking in water.

The latexes (emulsions) used in the present invention are dispersions of water insoluble, natural or synthetic polymers or copolymers where water is the continuous phase. The vast majority of synthetic latices are prepared directly by emulsion polymerization and have particle sizes of 500–1500 Å (0.05–0.15 microns). A large number of synthetic latices are available commercially and are readily blended into the thin film membranes of the invention. Such latices include for example acrylic latexes (aqueous, anionic dispersions of copolymers of acrylic esters); nitrile latexes (aqueous, anionic dispersions of butadiene-acrylonitrile copolymers); styrene-butadiene latexes, styrene-butadiene and vinyl pyridine, terpolymer latexes, vinyl and vinylidene chloride polymers copolymer latexes, resorcinol-formaldehyde latexes, polyvinyl chloride-acrylic copolymer latexes, vinyl fluoride latexes and the like. These latexes can be obtained whereby the polymers or copolymers therein vary as to their hardness, flamability, adhesive qualities, antioxidant properties, temperature flexibility, chemical resistance etc. These latexes are commercially available from the Dow Chemical Co., from the elastomer and latex division of the B. F. Goodrich Co. and numerous others. The terms latexes, emulsions and dispersions are used interchangeably herein to have the same meaning.

The amino compound used in the present invention are substantially those enumerated in U.S. Pat. No. 4,619,767, namely an aliphatic, alicyclic, aromatic, or heteroaromatic compound having at least two secondary amino groups in the molecule. As such amino compounds, there are, for example the following:

Formula I

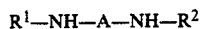

wherein A represents an alkylene group having from 2 to 8 carbon atoms. a divalent alicyclic group, a divalent aromatic group, or a divalent heteroaromatic group, and $R^1$ and $R^2$ each represents an alkyl group having from 1 to 3 carbon atoms;

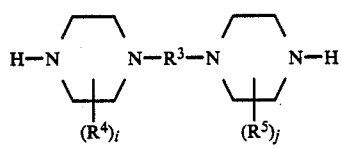

Formula II wherein $R^3$ represents an alkylene group having from 0 to 4 carbon atoms, $R^4$ and $R^5$ each represents an alkyl group having from 1 to 3 carbon atoms, and i and j each represents an integer of 0 to 4;

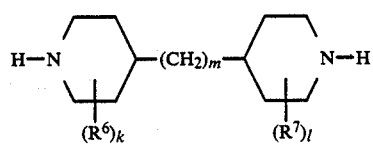

Formula III wherein $R^6$ and $R^7$ each represents an alkyl group having from 1 to 3 carbon atoms, k and l each represents an integer of 0 to 4, and m represents an integer of 0 to 4; and

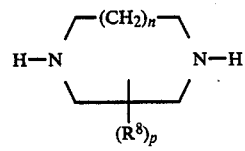

Formula IV wherein $R^8$ represents an alkyl group having from 1 to 3 carbon atoms, n represents 1 or 2, and p represents an integer of 0 to 4.

Preferred examples include:
Formula I

N,N'-dimethylethylenediamine, N,N'-dimethylpropylenediamine, N,N'-dimethyl-m-phenylenediamine, N,N'-dimethyl-p-phenylenediamine, 2,-6-dimethylaminopyridine, etc.

Formula II

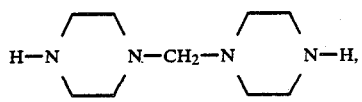

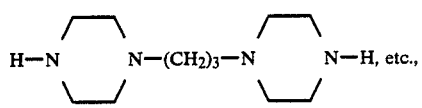

Formula III

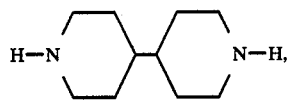

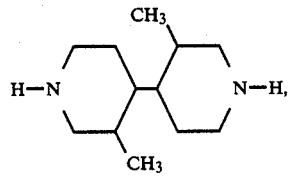

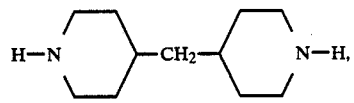

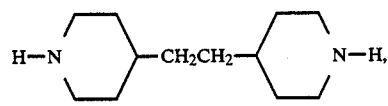

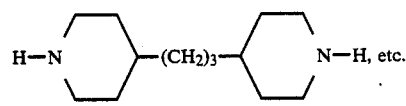

and
Formula IV
piperazine, 2-methylpiperazine, 2,5-dimethylpiperazine, homopiperazine (hexahydrodiazepine), etc.

The above listed amino compounds can be used alone or as a mixture of two or more thereof.

This composite semipermeable membrane is prepared according to the present invention which comprises a process of coating or impregnating a porous substrate with an aqueous solution containing a water insoluble latex or emulsion and an amino compound having at least two secondary amino groups in the molecule, thereafter contacting the porous substrate with a polyfunctional crosslinking reagent capable of reacting with secondary amino groups to polymerize the amino compound by crosslinking, and then heating the product.

The aqueous phase solution is prepared such that the amino compound is contained therein in an amount of from 10 to 500 parts by weight, and preferably from 20 to 300 parts by weight, based on 100 parts by weight of the latex solids, and the total content of the latex solids and the amino compound is from 0.05 to 10% by weight and preferably from 0.1 to 5% by weight. This solution may contain a surface active agent for reducing surface tension in the case of coating or impregnating the porous substrate. The thickness of the ultrathin film, which depends upon the concentrations of the latex component and the amino compound in the aqueous solution and the contacting time with the crosslinking reagent, is generally from 50 to 1000 Å, and preferably from 100 to 500 Å. If the ultrathin film is too thin, partial defects are caused on the film surface. On the other hand, if it is too thick, the water permeability decreases.

The porous substrate used in the present invention is suitably a membrane having an asymmetric structure wherein the surface pore size is generally from 50 to 5000 Å. For example, polysulfone, polyacrylonitrile, cellulose ester, polypropylene and polyvinyl chloride can preferably be used. Particularly, polysulfone is preferable. The porous membrane may be reinforced by backing with cloth or a non-woven web.

The polyfunctional crosslinking reagent used in the present invention is a compound having 2 or more functional groups capable of reacting with secondary amino groups and hydroxyl groups, for example, one or more kinds of acid halide groups, halogen sulfonyl groups, N-haloformyl groups, haloformate groups and acid anhydride groups, etc., in the molecule. Preferred examples include isophthaloyl chloride, trimesoyl chloride, terephthaloyl chloride, trimesic acid chloride, trimellitic acid chloride, trimellitic acid chloride anhydride, 1,3-dichlorosulfonyl benzene, picolinic acid chloride, 5-chlorosulfonyl isophthaloyl chloride, and piperazine-N, N-dicarboxylic acid dichloride. Trimesic acid chloride, trimellitic acid chloride, and isophthaloyl chloride are particularly preferable. Other cross-linkers would include multifunctional isocyanates.

EXAMPLE 1

A porous polysulfone substrate film on a woven polyester support fabric was evenly coated (by immersion) with an aqueous phase solution containing 0.25% by weight of butadiene-styrene latex polymer solids (Dow 238A), 0.25% by weight of the ammino compound piperazine, and 0.5% by weight of sodium hydroxide. It was then immersed for 30 seconds in the organic phase solution, that is, a n-hexane solution of 1% crosslinkers i.e. 0.4% by weight of trimesoyl chloride and 0.6% by weight of isophthaloyl chloride. The substrate was removed, allowed to dry in air and then allowed to set overnight at room temperature. The resulting composite membrane was tested in a stirred R.O. test cell at 60 psi using a 300 ppm NaCl solution and also a test using 150 ppm MgSO$_4$ solution. The flux rate was measured in gallons per sq. ft. of membrane per day (GFD). The results are shown in Table I.

EXAMPLES 2, 3, 4, 5 and 6

Composite membranes were fabricated using the same procedure as described in Example 1 with the following changes. Example 2 employed an acrylic copolymer latex and Example 3 a polyvinyl chloride-acrylic copolymer latex. Example 4 used the same styrene-butadience-copolymer latex in the aqueous phase as Example I but substituted Freon as the solvent in the organic phase in place of hexane. Example 5 did not employ any latex polymer in the formation of the thin film. Example 6 was the same as Example 1 except that N,N'-dimethyl-p-phenylenediamine was substituted for the piperazine. The resulting membranes were also tested and the results are also shown in Table 1.

TABLE 1

| Membrane | Emulson Type | NaCl % Rejection | NaCl Flux (GFD) | MgSO$_4$ % Rejection | MgSO$_4$ Flux (GFD) |
|---|---|---|---|---|---|
| Ex. 1 | Styrene-butadiene (Dow Latex 238) | 85 | 10 | 95 | 15 |
| Ex. 2 | Acrylic (Hycar ® 2679-B. F. Goodrich) | 75 | 15 | 90 | 20 |
| Ex. 3 | PVC-Acrylic (Geon ® 460 × 36-B. F. Goodrich) | 50 | 18 | 50 | 22 |
| Ex. 4 | Styrene-butadiene (238) | 82 | 1.5 | 87.5 | 2.0 |
| Ex. 5 | No Emulsion | 49 | 6 | 71 | 7.5 |
| Ex. 6 | Styrene-butadiene | 68 | 10. | 75 | 11 |

Various modifications may be made to the procedures described herein as would be obvious to one having the ordinary skill in the art, and such modifications are considered to be included within the scope of the invention which is defined by the claims appended hereto.

Various features of the invention are set forth in the claims which follow.

I claim:

1. A thin film composite semipermeable membrane comprising a porous substrate having a surface layer of an ultrathin film formed by polymerization of an aqueous mixture of a water emulsion of water insoluble polymers or copolymers and an amino compound having at least two secondary amino groups using a polyfunctional cross-linking agent capable of reacting with secondary amino groups.

2. The semipermeable membrane of claim 1 wherein said ammino compound is selected from the group represented by Formula I to IV:

Formula I $$R^1-NH-A-NH-R^2$$

wherein A represents an alkylene group having from 2 to 8 carbon atoms, a divalent alicyclic group, a divalent aromatic group, or a divalent heteroaromatic group, and R$^1$ and R$^2$ each represents an alkyl group having from 1 to 3 carbon atoms;

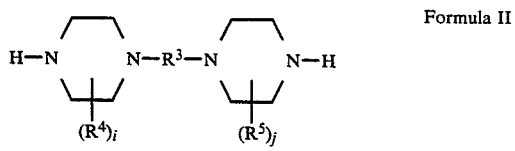

Formula II wherein R$^3$ represents an alkylene group having from 0 to 4 carbon atoms, R$^4$ and R$^5$ each represents an alkyl group having from 1 to 3 carbon atoms, and i and j each represents an integer of 0 to 4;

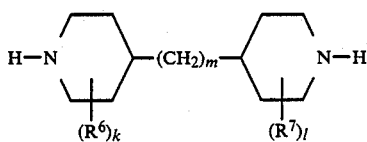

Formula III wherein $R^6$ and $R^7$ each represents an alkyl group having from 1 to 3 carbon atoms, k and l each represents an integer of 0 to 4, and m represents an integer of 0 to 4; and

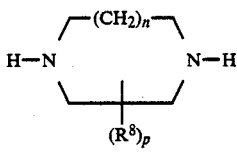

Formula IV wherein $R^8$ represents an alkyl group having from 1 to 3 carbon atoms, n represents 1 or 2, and p represents an integer of 0 to 4.

3. A composite semipermeable membrane according to claim 1, wherein said polyfunctional crosslinking reagent has 2 or more functional groups selected from acid halide groups, N-haloformyl groups, haloformate groups, halogen sulfonyl groups, acid anhydride groups and isocyanate.

4. A composite semipermeable membrane according to claim 1, wherein said porous substrate is composed of polysulfone, polyacrylonitrile, cellulose ester, polypropylene or polyvinyl chloride.

5. A composite semipermeable membrane according to claim 1, wherein the porous substrate has a surface pore size of from 50 to 5000 Å and wherein said substrate film has a thickness of from 50 to 1000 Å.

6. A composite semipermeable membrane according to claim 1 wherein said amino compound-emulsion thin film is formed in situ on said porous substrate by interfacial polymerization or condensation.

7. A composite semipermeable membrane according to claim 1 wherein said water emulsion is a latex selected from the group consisting of a polymer or copolymer latex of acrylic ester, butadiene-acrylonitrile, styrene-butadiene, styrene-butadiene and vinyl pyridine, vinyl and vinylidine chloride, vinyl fluoride, vinylidene fluoride, resorcnol-formaldehyde, polyvinyl chloride-acrylic, ethylene-vinyl acetate, acrylic ester-vinyl acetate, ethylene-polyvinyl chloride and mixtures thereof.

8. The semipermeable membrane of claim 1 wherein said amino compound is selected from the group consisting of:
Formula I
N,N'-dimethylethylenediamine, N,N'-dimethylpropylenediamine, N,N'-dimethyl-m-phenylenediamine, N,N'-dimethyl-p-phenylenediamine, 2,-6-dimethylaminopyridine,

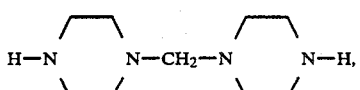

Formula II

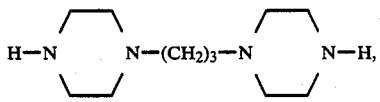

Formula III

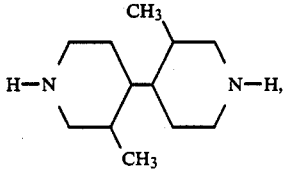

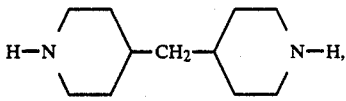

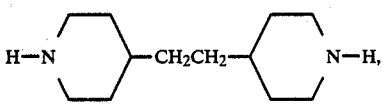

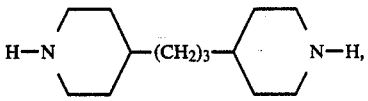

Formula IV
piperazine, 2-methylpiperazine, 2,5-dimethylpiperazine, homopiperazine and mixtures thereof.

9. A process of preparing a thin film composite semipermeable membrane comprising coating a porous substrate with an aqueous solution containing an emulsion or dispersion of water insoluble polymers or copolymers and an amino compound having at least two secondary amino groups, contacting said coated porous substrate with an organic solvent containing at least one polyfunctional crosslinking agent capable of reacting with secondary amino groups to cross-link said amino compound and thereafter heating the resulting structure.

* * * * *